United States Patent [19]

Foster et al.

[11] Patent Number: 5,188,425
[45] Date of Patent: Feb. 23, 1993

[54] PRETENSIONING LATCHING MECHANISM

[75] Inventors: Howard J. Foster; Ian A. Gordon; Martin Palliser, all of Carlisle, Great Britain

[73] Assignee: B.S.R.D. Limited, Carlisle, Great Britain

[21] Appl. No.: 680,178

[22] Filed: Apr. 3, 1991

[30] Foreign Application Priority Data

Apr. 3, 1990 [GB] United Kingdom ............... 9007502
Jul. 14, 1990 [GB] United Kingdom ............... 9015536

[51] Int. Cl.⁵ .............................................. B60R 22/18
[52] U.S. Cl. ............................ 297/473; 297/479
[58] Field of Search ............ 297/473, 476, 477, 479, 297/468; 280/801, 804

[56] References Cited

U.S. PATENT DOCUMENTS 4,607,863 8/1986 Yokote ........................... 297/473 X
4,767,161 8/1988 Sedlmayr et al. ............. 297/477 X
4,790,597 12/1988 Bauer et al. ..................... 297/473 X

FOREIGN PATENT DOCUMENTS 318127 4/1988 European Pat. Off. .
306299 3/1989 European Pat. Off. ............ 297/479
8812852 10/1988 Fed. Rep. of Germany .
3734152 4/1989 Fed. Rep. of Germany .
0128543 8/1989 Japan .

Primary Examiner—Peter R. Brown

[57] ABSTRACT

A pretensioner latching mechanism having a main anchorage member (45) to be fixed to a frame (60) of a slideably adjustable vehicle seat, a further member (52) slideable along the first member under the action of a remote vehicle body mounted pretensioner through a bowden cable (49; 50) to shorten and latch an anchorage assembly (41, 42, 43, 45) by virtue of abutment of a spring loaded latch member (56) with one of a succession of abutments provided by apertures (46) of the main anchorage member.

12 Claims, 4 Drawing Sheets

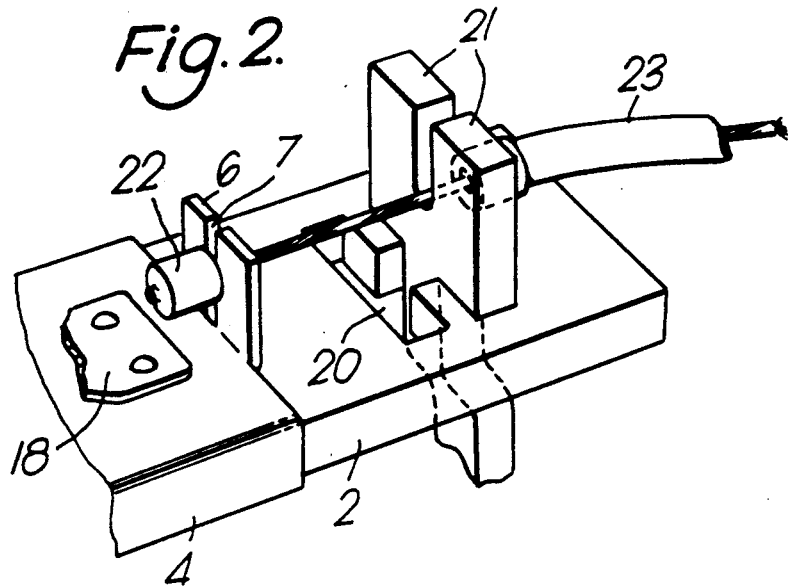
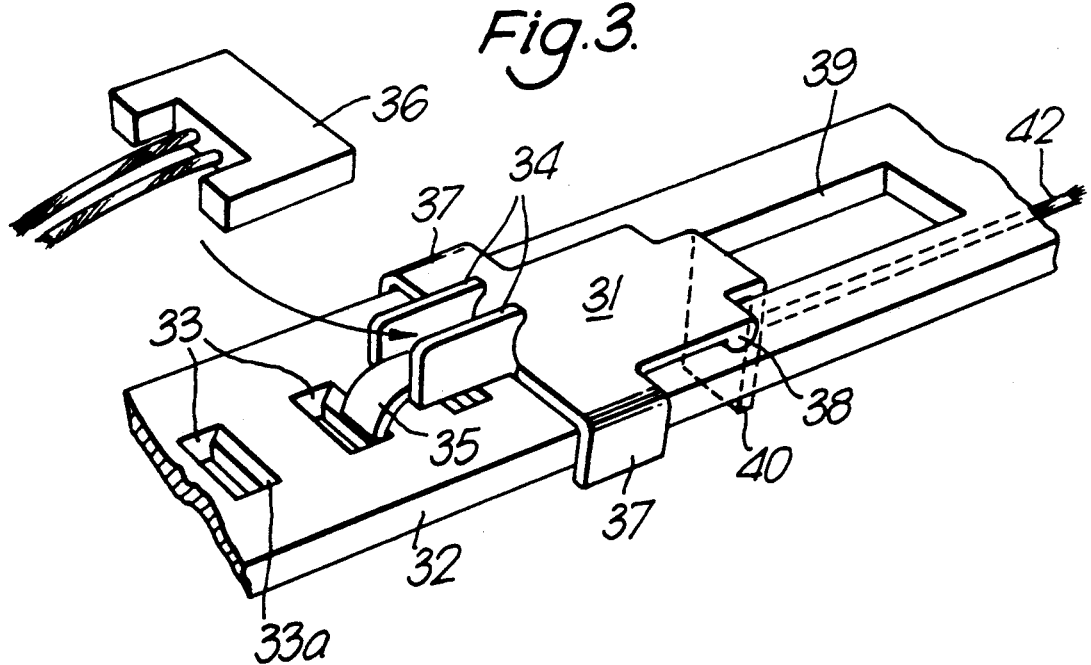

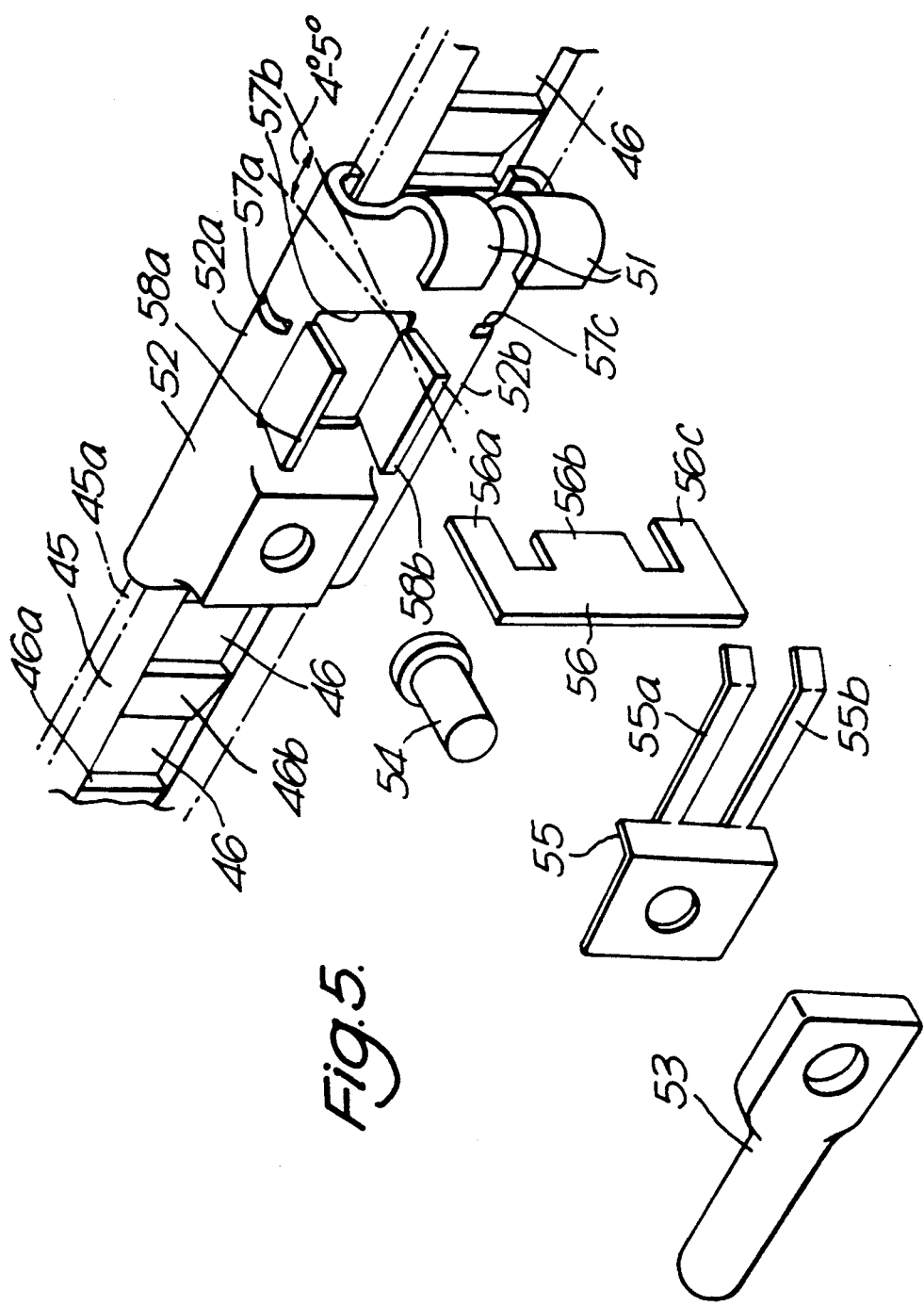

PRETENSIONING LATCHING MECHANISM

BACKGROUND AND SUMMARY OF THE INVENTION

This invention relates to a latching mechanism for a passenger vehicle safety restraint including pretensioning means for pretensioning of a seat belt by means of a crash sensitive pretensioner device.

Vehicle passenger safety restraints most commonly comprise a safety belt which comprises an anchorage or automatic locking webbing retractor on one side of the respective seat from which webbing passes via a shoulder height fitting and diagonally across the occupant to a buckling tongue which is engageable with a buckle anchorage at the other side of the seat. Usually such webbing returns from the buckling tongue as a lap webbing to a floor anchorage on the first side of the seat. Although such a restraint is usually self-tightening by virtue of a retractor and the retractor locks, in the event of specified lower webbing sensing or vehicle sensing 'g' values, it is desirable to provide separate means for independently tightening the webbing in impending crash conditions and it has been proposed to provide a pretensioning device in the buckle anchorage.

In automotive vehicles, more especially certain passenger cars, it has been proposed to at least partially integrate the mechanism of mandatory seat belts, especially for movable front seats, into the structures of the seats themselves. While the structure of a seat, especially the mountings and the seat back, need to be more strongly built than in arrangements where webbing retractors and mountings are located on the vehicle door pillars (B-posts), an integrated belt arrangement can provide enhanced convenience for the user and less obstruction of passenger access to rear seats.

Arrangements for integrating a seat belt into a vehicle seat have previously been proposed and it may be noted that when a crash sensitive belt pretensioner is included, it is desirable that the sensing and activating mechanism thereof shall be mounted not on the seat but on the vehicle body, so that manual seat adjustments will not result in activation thereof.

One form of crash-anticipating belt pretensioner is described in European Patent Application No. 88308075.6. In order to use such a pretensioner in connection with a seat belt arrangement which is integrated into a seat structure it is desirable that the pretensioner shall be conveniently located on the vehicle body and connected via a bowden cable to respective movable seat belt anchorage, typically a buckle carried by the movable seat structure. In that case it is desirable to provide means whereby while the bowden cable is required to transmit pretensioning shortening movement to such buckle, neither the pretensioner nor the bowden cable is required to support the full 'g' forces created by weight transfer of an occupant during a crash.

It is an object of the present invention to provide a simple and robust pretension latching mechanism for a safety restraint.

According to the present invention there is provided a pretension latching mechanism comprising a first member guidingly carrying a second member for movement over a range of latching positions relative to the first member, one said member having a succession of abutments and the other said member having a latching abutment lockingly engageable with said succession of abutments, one said member having connecting means for connection to a safety restraint and connection means for connection to pretensioning means operation of which acts on said one member to move it relative to the other member to a position in which it tensions the restraint and so that subsequent tension in the restraint is reacted by engagement of said latching abutment with one of said succession of abutments.

In a safety restraint system in which the pretensioning means is located separately from the respective restraint anchorage, the connection means for connection to the pretensioning means may comprise a means for a flexible connection such as a bowden cable. In such a case the anchorage may be mounted to be adjustable with the frame of a respective seat whereas the sensitive pretensioner itself may be mounted directly on the vehicle body so as to be not sensitive to seat adjustment movements. Alternatively, if the respective anchorage is to be attached to the vehicle body, the pretensioning means, which may comprise a compressed spring, can be included in one assembly with the latching mechanism.

Said succession of abutments can be provided by recesses of the first member and the first abutment is a movable detent provided on the locking member.

In one example said second member may comprise a slider on which said abutment member is pivotally mounted, said slider carrying said means for connection via a flexible connection to the pretensioner. In such an example said abutment member may carry attachment means for the restraint tension and said restraint being attached at a point in relation to the pivotal mounting such that it tends to urge said detent into engagement with a recess of said mounting member and said slider may carry spring means urging said detent against said surface.

In another example the second member may itself be tiltably guidingly carried by the first member and have attachment means for the restraint tension such that tension therein tends to urge the respective abutment thereof into engagement with the succession of abutments of the first member.

In another example the latching abutment may comprise a plate-like element carried by the second member and spring loaded towards said first member to be engageable with the succession of abutments thereof.

In order that the invention be more clearly understood and readily carried into effect, the same will be further described by way of example with reference to the accompanying drawings of which

BRIEF DESCRIPTION OF THE DRAWINGS

In the drawings:

FIGS. 1 and 2 illustrate in diagramatic form a pretension latching mechanism in accordance with the invention.

FIG. 3 illustrates a modification of FIG. 1.

FIGS. 4 and 5 illustrate an alternative mechanism.

DETAILED DESCRIPTION OF THE DRAWINGS

Figure 1:
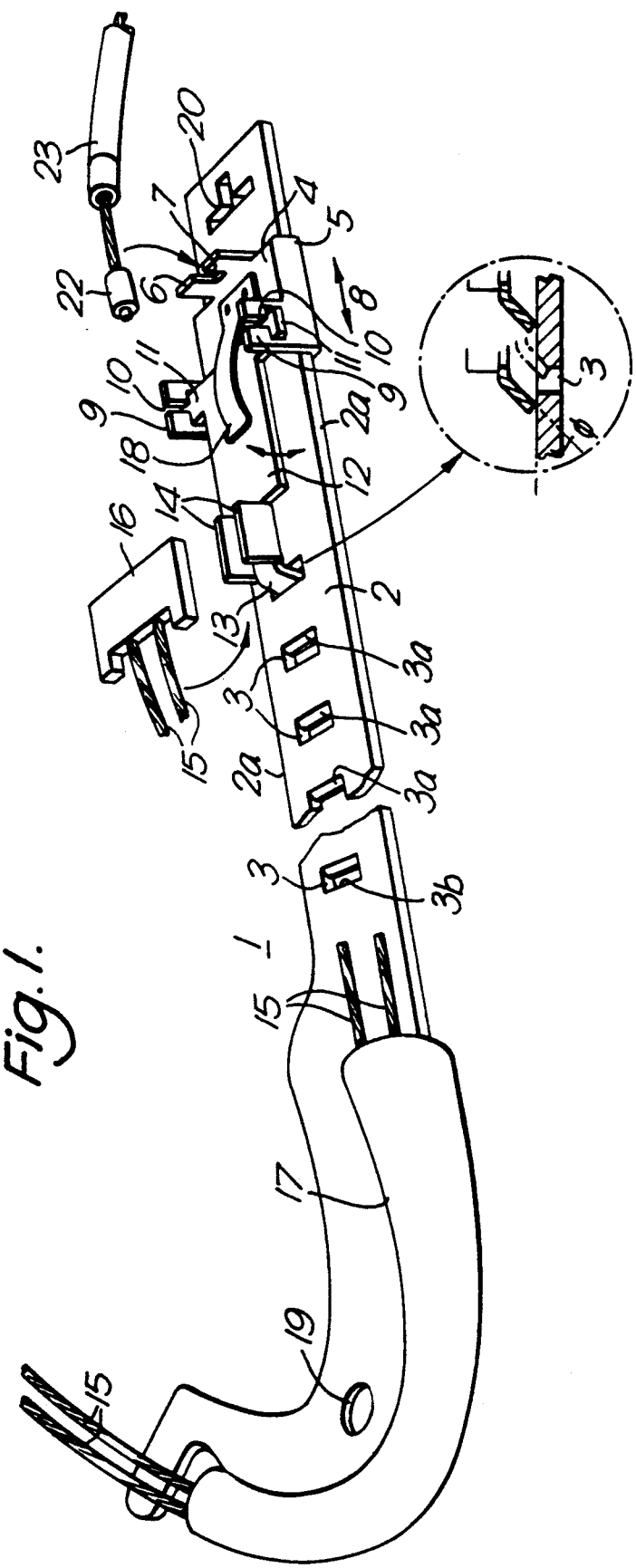

Referring to FIG. 1, the mechanism shown therein has a mounting member comprising a steel pressing 1 having a first rectilinear member 2 of rectangular cross section provided with a succession of spaced apertures 3 with deflection chamfers 3a on their right hand edges. Linearly movable along the member 2 there is a second slider member 4 shaped to have side portions 5 to wrap around the respective edges 2a of member 2. Slider 4 is provided with an end projection 6 having an open-ended slot 7 extending at right angles to the face of 4 and the direction of movement denoted by arrows 8. Slider 4 also has further outward projections 9 provided with T-shaped slots 10 locating lateral ears 11 of a generally planar pressed steel latching abutment member 12.

Latching member 12 is formed to provide a detent 13 directed towards the adjacent face of portion 2 and further oppositely directed projections 14 between which buckle cable ends 15 are receivable at the point of entry into a cable-crimp 16. Typically, the buckle cable extends in one length from the crimp 16, through a curved guide portion 17, around a strong point of a seat belt buckle (not shown) and back through the guide 17 to the crimp 16.

In order to lightly urge detent 13 of locking member 12 towards the portion 2 about the pivot provided by the ears 11, the slider 4 carries a leaf spring 18, the free end of which presses against the outward face of locking member 12 urging the detent into a respective aperture 3. As shown inset, however, the angle $\phi$ of detent 13 relative to the face of portion 2 is such as to enable the detent to ride out of any aperture 3 to permit rightward pretensioning movement of slider 4 but to ensure positive latching into the first aperture reached during subsequent slight leftward movement thereof.

For the purpose of easy mounting the mechanism to a seat frame to provide a buckle storage, it is provided firstly with a T-shaped slot 20 engageable with a bracket 21 of the seat frame as shown in FIG. 2 and secondly with a drilling 19 to receive a mounting and positioning bolt. As also seen in FIG. 2, the bracket 21 provides a ground point to receive the cable casing end of the bowden cable 23, the crimp 22 of the inner end of which is located by slot 7 in projection 6 of slider 4.

In operation of the device of FIG. 1, a flexible connection comprising a bowden cable 23 has its end (not shown) connected to a pretensioner device of any suitable form. Such device may comprise for example an actuator powered by a helical spring, a coil spring, compressed gas or a pyrotechnic device. The cable 15 is connected to a buckle, webbing terminal, or even an intermediate tensioning element acting on a bight of seat belt webbing.

In the normal installed condition the slider 4 is positioned in its left most position with a primed pretensioner connected thereto via the bowden cable. In the event of the pretensioner (not shown) being activated upon sensing of vehicle deceleration indicative of an imminent crash condition, the crimp 22 is rapidly withdrawn rightwards taking slider 4 and element 12 with it, detent 13 riding over chamfers 3a, to a point where the tension in cable 15 takes over. At that point aided by the chamfers 3a, the detent 13 is then able to enter and abut with the left hand edge of the first of the apertures 3 which it reaches after reversing direction. Immediate latching occurs, thereby isolating the buckle cable forces from the bowden cable and the pretensioner and transferring those forces via 14, 12 and 13 to the member 2 and the seat structure.

In the simplified version of the locking mechanism as illustrated in fragmentary form in FIG. 3, the slider and the locking member are integrated into a single component 31 slideable along rectilinear portion 32, similar to the portion 2 of FIG. 1, and provided with spaced apertures 33 (having a chamfer 33a) for receiving a locking detent 35. Outwardly directed projections 34 receive a cable crimp 36 as before but the member 31 is additionally provided with side wings 37 which slidingly engage the sides of the portion 32. The member 31 also has lobes 38 which slidingly engage the adjacent face of 32. The portion 32 is now provided with a longitudinal slot 39 through which a downward projection 40 of slider 31 is able to slidingly extend. The projection 40 is provided with a slot to receive and retain the crimp end of the bowden inner cable 42 coming from the pretensioner as before.

In operation the action of the respective cables and the lobes 38 provided on component 31 is such as to urge the detent 35 towards the respective nearest leftward aperture 33 and ensure locking therein as before, following pretensioner operation.

Figure 4:
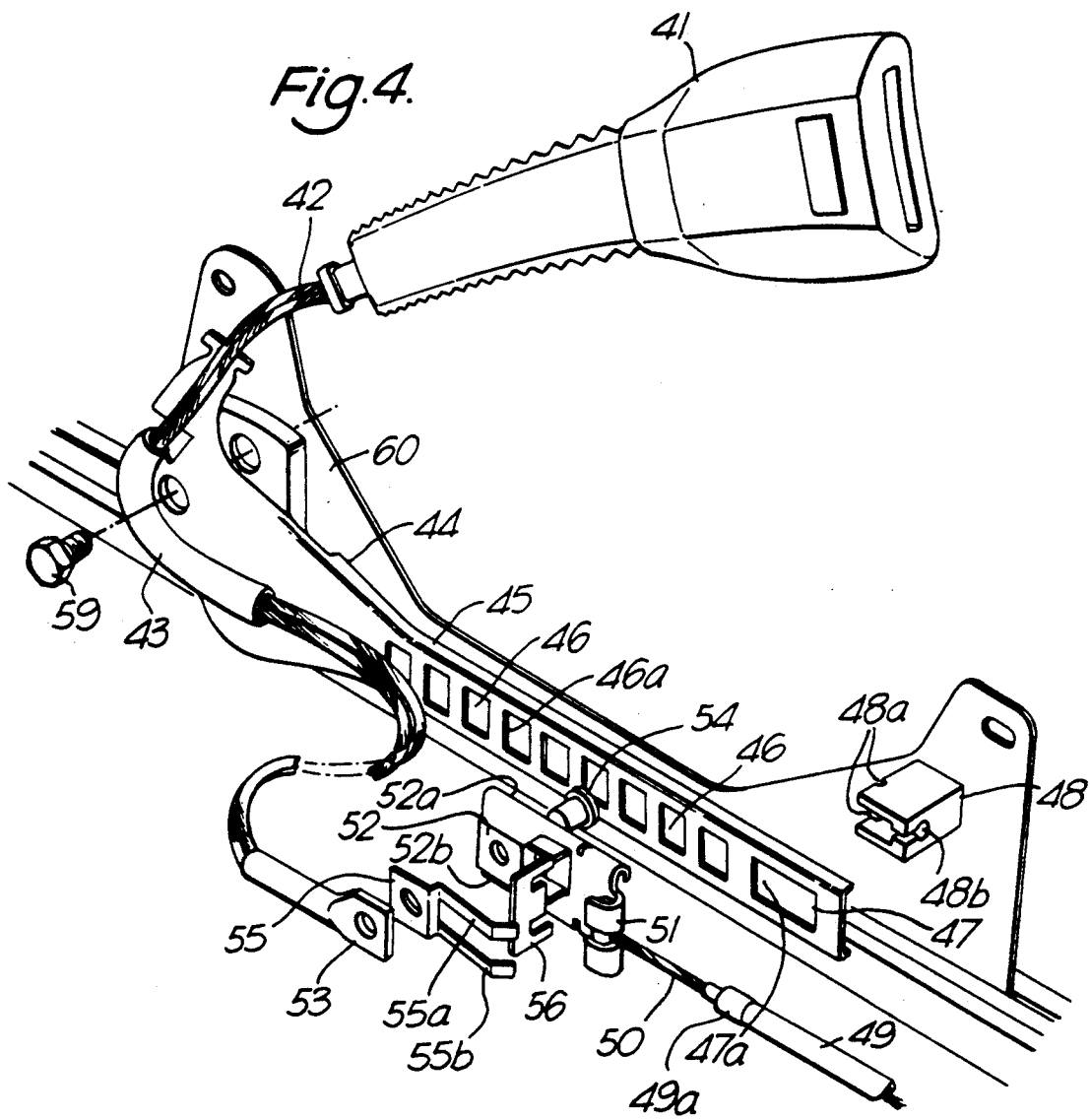

Referring to FIG. 4 and the enlarged fragment thereof shown in FIG. 5, the latching mechanism comprises a seat belt tongue receiving buckle 41 of known construction connected to a buckle cable 42. The buckle cable 42 passes through a guide 43 provided at one end of a mounting member 44 which embraces a linear pressed steel track member 45 provided with a succession of equally spaced rectangular apertures 46. The furthermost aperture 47 is an elongate rectangular aperture to receive and be located by mounting bracket 48. The bracket 48 is provided with slots 48a having tapered entry to receive in rattle free manner an edge 47a of aperture 47; and an open ended keyhole slot 48b to receive the end ferrule 49a of a pretensioner outer cable 49. The cable end of the pretensioner inner cable 50 is received by a hooked end 51 of a pressed steel slider 52 formed with U-section sides 52a and 52b which match with and freely run along the edges 45a of the track portion 45. The buckle cable emanating from the guide 43 is attached to a crimped spade fitting 53 to be attached by a rivet 54 to the slider. The rivet further serves to retain a two-armed leaf spring 55 of which the arms 55a, 55b bear against a planar steel locking element 56 with lateral portions slideable in slots 57a, 57b, 57c of the slider. The locking element 56 is thereby retained transverse to and urged toward the apertures 46. The leading edges 46a of the apertures 46 are formed substantially at right angles to the track 45 and provide locking abutments with central lateral portion 56b of the locking element, whereas the trailing edges 46b of the apertures, having regard for rightward movement of the slider, are formed with ramps 46b which are able to lead the projection 56b out of one aperture 46 towards the next. The slots 57a and 57c are angled at a few degrees, such as for example, 4° or 5° to the perpendicular so that plate 56 is tilted at 4° or 5° towards the hook end 51 to enhance the locking effect. The plate is also supported at such angle by outwardly extending ears 58a and 58b clearly to be seen in FIG. 5, against tilting due to the reaction of the abutments.

The mounting member 44 is mounted at one end to a vehicle seat frame 60 by means of the bracket 48 with edge 47a located in slot 48a and at the other end by means of a substantial anchor bolt 59.

In operation, a releasable safety belt tongue is connected to the buckle 41 in the usual way to restrain the belt passing across the front of the seated occupant, the buckle cable 42 being set fully extended from the guide 43 by virtue of slider 52 being positioned at the left hand end of track 45. In the event of vehicle deceleration being such as to activate the pretensioner (not shown), connected to cable 50 under crash conditions, the rapidly applied force applied to the cable pulls the slider 52 rightwards along the track 45 to tension the buckle cable, the central projecting portion 56b of the locking element 56 successively riding up the ramps of apertures 46 until coming to rest. The spring 55 acting against the locking element ensures that the portion 56b abuts a leading edge of an aperture and prevents appreciable return movement of the slider under the action of the g-force subsequently applied by the occupant to the belt and cable 42.

Various modifications of the above-described mechanisms may be envisaged to make assembly easier. For example, in the assembly of FIG. 4, the spring 55 may be provided with an arm which rests against the retained cable end of cable 50 to assist in retaining same in the hooked end 51 of the slider. Again, the slots of the mounting bracket 48 may include an entry step for providing a positive stop before longitudinal sliding of edge 47a into the slots. Furthermore, although not shown, the cable 42, guide 43, and parts 44 and 45 are preferable provided with a cover (not shown) the part of which adjacent the buckle 41 and enclosing the cable 42 is flexible and easily compressible on operation of the pretensioner.

Since the latching mechanism is attached to the seat frame, the position of the buckle 41 in relation to the seat remains substantially unaltered by adjustment of the seat position. Moreover, since the pretensioner (not shown) is mountable to the vehicle and connected to the seat frame only via a flexible connection, any jerky movement of the seat by way of adjustment is unable to activate the pretensioner. Again, the latching mechanism serves to isolate the forces of the seat belt, under crash condition, from the flexible connection 49, 50 and from the pretensioner. Both the latter items therefore need only to be sufficiently robust to transmit the initial pretensioning force.

Many changes and modifications in the above described embodiment of the invention can, of course, be carried out without departing from the scope thereof. Accordingly, the scope is intended to be limited only by the scope of the appended claims.

We claim:

1. A pretensioning latching mechanism for a safety restraint system, the mechanism comprising an elongated first member (2;45) guidingly carrying a second member (5; 52) for movement over a range of latching positions relative to the first member, said first member having a succession of abutments (3b, 46a) and the second member having a latching member (13; 35; 56b) lockingly engageable with said succession of abutments means (5, 37, 52a, 52b) guiding the second member for free movement along an exterior surface of the first member comprising downwardly and inwardly extending side edges on the second member which slidably engage edges of the first member, said second member connected at one end to a safety restraint connection means (21; 51) and connected at another end to a pretensioning means acting on said second member to move the second member relative to the first member to a position in which the safety restraint connection means is placed in tension so that subsequent tension in the safety restraint connection means is reacted by engagement of said latching member with one of said succession abutments.

2. A pretension latching mechanism as defined in claim 1 wherein said second member is connected to said pretensioning means via a flexible linkage including a bowden cable.

3. A pretension latching mechanism as defined in claim 2, wherein said first member (2; 32; 45) has a substantial straight part with parallel edges (2a; 32a; 45a) and said second member is provided with respective side portions (5; 37; 52a) which slidingly engage said edges.

4. A pretension latching mechanism as defined in claim 3, wherein said succession of abutments is provided by apertures or recesses (3; 33; 46) of the first member.

5. A pretension latching mechanism as defined in claim 3, wherein said latching member is provided by a locking member (12; 31) pivotally mounted on the second member.

6. A pretension latching mechanism as defined in claim 3 wherein said latching member is provided by a locking plate (56) slideably carried by the second member and resiliently urged toward the first member.

7. A pretension latching mechanism as defined in claim 2, wherein said succession of abutments is provided by apertures or recesses (3; 33; 46) of the first member.

8. A pretension latching mechanism as defined in claim 7, wherein said apertures or recesses (3; 33; 46) provided with deflection ramps or chamfers (3a; 33a; 46b) at their trailing edges.

9. A pretension latching mechanism as defined in claim 2, wherein said latching member is provided by a locking member (12; 31) pivotally mounted on the second member.

10. A pretension latching mechanism as defined in claim 2 wherein said latching member is provided by a locking plate (56) slideably carried by the second member and resiliently urged toward the first member.

11. A pretension latching mechanism as claimed in claim 10, wherein the second member (52) is formed with at least one outward extending ear (58a, 58b) to support the locking plate against tilting due to reaction between the abutments.

12. A pretension latching mechanism as claimed in claim 11 wherein said locking plate (56) is supported at an angle of a few degrees from the normal to said second member towards the abutment.

* * * * *